Patented Aug. 10, 1943

2,326,228

UNITED STATES PATENT OFFICE 2,326,228

CHEMICAL PROCESS

Morris S. Kharasch and Herbert C. Brown, Chicago, Ill., assignors to E. I. du Pont de Nemours & Company, Wilmington, Del., a corporation of Delaware No Drawing. Application February 12, 1940, Serial No. 318,649

2 Claims. (Cl. 260—544)

This invention relates to a new process of forming carboxylic acid chlorides and more particularly to the use of oxalyl chloride to produce said carboxylic acid chlorides.

This invention has as an object to provide a new process of forming carboxylic acid chlorides. A further object is to develop a new use for oxalyl chloride. A still further object is to maintain reaction conditions which enable oxalyl chloride to react with organic compounds to produce carboxylic acid chlorides. A still further object is to provide a novel and easily conducted process of making carboxylic acid chlorides which can be converted into carboxylic acids by hydrolysis. Other objects will appear hereinafter.

These objects are accomplished by the following invention according to which an organic compound, the molecule of which contains a portion which is aliphatically saturated, is reacted with oxalyl chloride in the presence of actinic light and/or a peroxide. Saturated aliphatic and alicyclichydrocarbons are readily converted to carboxylic acid chlorides by this method.

The following examples illustrate but do not limit the invention. All parts are given by weight.

Example I 25.2 parts of cyclohexane and 9.6 parts of oxalyl chloride were illuminated by a strong light source. This mixture was refluxed gently for 24 hours. The gases evolved were found to consist of approximately equal parts of carbon monoxide and hydrogen chloride. At the completion of 24 hours, the reaction mixture was fractionated, and it was found that 4.2 parts of oxalyl chloride had reacted to form 4.1 parts of cyclohexane carboxylic acid chloride (B. P. 99–101 C./52 mm.). The yield was 85%. The identification of the product was made by a determination of the neutralization equivalent and the preparation of the amide, M. P. 185–6° C.

Example II 28.8 parts of methyl cyclohexane, 25.4 parts of oxalyl chloride and 1.2 parts of benzoyl peroxide were placed in a reaction container. This mixture was refluxed gently for 24 hours At the completion of 24 hours, the reaction mixture was fractionated, and a 65% yield of methyl cyclohexane carboxylic acid chloride was obtained. The identification of the product was made by a determination of the neutralization equivalent and the preparation of the amide.

Some high boiling product is formed indicative of the formation of methyl cyclohexane dicarboxylic acid chlorides.

Example III 55.6 parts of chlorocyclohexane and 25.4 parts of oxalyl chloride and 1.2 parts of benzoyl peroxide were placed in a reaction container. This mixture was refluxed gently for 24 hours. At the completion of 24 hours, the reaction mixture was fractionated in vacuo. A 60% yield of chlorocyclohexane carboxylic acid chloride was obtained. The identification of the product was made by a determination of the neutralization equivalent.

Example IV 21 parts of cyclopentane and 25.4 parts of oxalyl chloride were illuminated by a strong light source. This mixture was refluxed gently for 24 hours. The reaction mixture was fractionated, and a 50% yield of cyclopentane carboxylic acid chloride was obtained. The identification of the product was made by a determination of the neutralization equivalent.

Example V 25.2 parts of methyl cyclopentane, 25.4 parts of oxalyl chloride, and 1.2 parts of benzoyl peroxide were placed in a reaction container. It was found desirable in all of these reactions to introduce the peroxide in small portions over the entire reaction period. This mixture was refluxed gently for 24 hours. The yield of methyl cyclopentane carboxylic acid chloride is 60%.

Example VI 28.8 parts of normal pentane, 25.4 parts of oxalyl chloride, and 1.2 parts of benzoyl peroxide (added periodically in small amounts) were placed in a reaction container. This mixture was refluxed gently for 24 hours. A 40% yield of hexanoic acid chloride was formed. The fact that a hexanoic acid chloride was formed was proved by a determination of the neutralization equivalent of the acid.

Example VII 40 parts of normal heptane and 25.4 parts of oxalyl chloride were illuminated by a strong source of actinic light. This mixture was refluxed gently for 24 hours. At the completion of 24 hours, the reaction mixture was fractionated, and it was found that an octoic acid chloride was formed. The neutralization equivalent of the acid indicated an octoic acid.

Example VIII 44.8 parts of iso-octane and 25.4 parts of oxalyl chloride were illuminated by a strong source of actinic light. This mixture was refluxed gently for 24 hours. At the completion of 24 hours, the reaction mixture was fractionated, and it was found (from the neutralization equivalent) that an iso-nonoic acid chloride was formed.

Example IX 47 parts of toluene, 25.4 parts of oxalyl chloride, and 2.8 parts of benzoyl peroxide (added periodically in small portions) were placed in a reaction container. This mixture was refluxed gently for 24 hours. At the completion of 24 hours, the excess of toluene was removed in vacuo. The acid chloride was then hydrolyzed with water and alkali. The alkaline solution was acidified with $H_2SO_4$ and extracted with ethyl ether. Upon evaporation of the ether a product was obtained which upon crystallization melted at 76° C. This is the melting point of phenyl acetic acid. The yield was 45%.

Example X 90 parts of cetane and 25.4 parts of oxalyl chloride were illuminated by a strong light source. The mixture was heated to 60–70° C. for 24 hours. At the completion of 24 hours, the reaction mass was treated with water and sodium carbonate solution, and the unreacted cetane extracted with ligroin. The water solution upon acidification yields a heptadecoic acid.

Example XI 90 parts of a saturated white mineral oil, 25.4 parts of oxalyl chloride and 2.5 parts of lauroyl peroxide (added periodically in small quantities) were placed in a reaction container. This mixture was heated at 60–70° C. for 24 hours. The reaction mixture was treated with water and sodium carbonate and extracted with ligroin. The water solution upon acidification yields a carboxylic acid of the white oil.

Example XII 40 parts of pinene and 25.4 parts of oxalyl chloride were illuminated by a strong light source. This mixture was heated at 60–70° C. for 24 hours. At the completion of 24 hours, the excess of pinene was removed in vacuo. The residue was treated with water and sodium carbonate, and extracted with ethyl ether. The water solution upon acidification yields a carboxylic acid of pinene as indicated by the neutralization equivalent of the acid.

Example XIII 41.6 parts of styrene and 25.4 parts of oxalyl chloride were placed in a reaction container, and gently refluxed for 24 hours. At the end of that time, the unchanged styrene and oxalyl chloride were removed in vacuo. The residue was treated with water and sodium carbonate, and extracted with ethyl ether. The water solution upon acidification yields cinnamic acid in 60% yield.

Example XIV

The procedure outlined in Example XIII may be followed with symmetrical diphenyl ethylene. Yields of 70% of diphenyl ethylene carboxylic acid are thus readily obtained.

Example XV

Phenyl acetylene may be substituted for styrene in Example XIII. Yields of 40–50% of phenyl propiolic acid are thus readily obtained.

Example XVI 99 parts of dodecyl benzene, 25.4 parts of oxalyl chloride, and 2.3 parts of benzoyl peroxide (added periodically in small amounts) were placed in a reaction container. This mixture was heated gently at 80–90° C. for 24 hours. The phenyl dodecane carboxylic acid was isolated by the procedure described in Example XIII.

Example XVII 101 parts of dodecyl cyclohexane, 25.4 parts of oxalyl chloride, and 3.6 parts of benzoyl peroxide (added periodically in small quantities) were placed in a reaction container. This mixture was heated at 70–90° C. for 24 hours. The dodecyl cyclohexane carboxylic acid was isolated according to the procedure described in Example XIII.

Example XVIII 45 parts of ethyl thiophene, 25.4 parts of oxalyl chloride, and 4.5 parts of lauroyl peroxide (added periodically in small amounts) were placed in a reaction container. This mixture was refluxed gently for 24 hours. The acid was isolated as described in Example XIII.

Example XIX 120 parts of paraffin wax, 25.4 parts of oxalyl chloride, and a total of 4 parts of benzoyl peroxide (added periodically in small quantities) were placed in a reaction container. This mixture was heated at 90° C. for 24 hours. The acid was isolated as described in Example XIII.

Example XX 56.4 parts of butyl chloride, 25.4 parts of oxalyl chloride and a total of 2.5 parts of benzoyl peroxide (added periodically in small quantities) were placed in a reaction container. This mixture was refluxed gently for 24 hours. At the completion of 24 hours, the excess of reagents was removed in vacuo, and the product isolated as described in Example I.

The yields obtained vary considerably depending upon what reactants have been selected. In many cases the yields are exceptionally high running up to 85–90%. In Examples I to XV the yields which are mentioned are based upon the amount of oxalyl chloride actually consumed in the reaction.

It will be noted from the examples that a large variety of compounds can be converted to carboxylic acid chlorides by the novel chemical processes herein disclosed. In general, any organic compound, the molecule of which contains a portion which is aliphatically saturated can be converted to a carboxylic acid chloride by these methods. This category of suitable organic compounds includes a number of subclasses as indicated below.

(1) Saturated aliphatic straight and branched chain hydrocarbons, such as pentane, heptane, octane, iso-octane, nonane, decane, dodecane, cetane, octadecane, and saturated petroleum fractions such as saturated gasolines, saturated kerosenes, saturated white oils, and paraffin waxes.

(2) Saturated alicyclic hydrocarbons, such as cyclohexane, methyl cyclohexane, dodecyl cyclohexane, cyclopentane, methyl cyclopentane, menthane, camphane, naphthenes, and decahydronaphthalene.

(3) Alkyl halides, such as chlorocyclohexane, butyl chloride, dodecyl bromide, cetyl chloride, and chlorinated kerosene.

(4) Alkyl substituted aromatic hydrocarbons, such as toluene, propyl benzene, octyl benzene, decyl benzene, dodecyl benzene, hexadecyl benzene, amyl naphthalene, octyl naphthalene, decyl naphthalene, dodecyl naphthalene, meta xylene, dibutyl benzene, dioctyl benzene, dioctyl naphthalene, didecyl naphthalene, mesitylene, triamyl benzene, and tetra-amyl benzene. This subclass includes mixtures of alkylated aromatic hydrocarbons which may be obtained by condensing chlorinated kerosenes or white oils with aromatic hydrocarbons, such as benzene, xylene, and methyl naphthalene, by means of the Friedel-Craft reaction, and also various alkylated aromatic hydrocarbons obtained by alkylating benzene or naphthalene with various mixtures of alcohols or mixtures of olefines. When the compounds belonging in this subclass are reacted with oxalyl chloride in accordance with this invention, substitution of the —COCl group generally occurs only in the aliphatic portion of the molecule as illustrated by Example IX.

(5) Certain other hydrocarbons, such as pinene and tetrahydronaphthalene which are substantially aliphatically saturated.

(6) Aliphatic carboxylic acids and acid chlorides, such as palmitic acid, stearic acid, and their chlorides.

(7) Aliphatic sulfonic acids and sulfonyl chlorides, such as those which are obtained from saturated white mineral oils by the method described in U. S. Patent 2,046,090.

(8) Aliphatic alcohols, such as dodecyl alcohol, cetyl alcohol, and mixtures of alcohols obtainable by catalytic hydrogenation of higher fatty acids or naturally occurring esters of the higher fatty acids.

(9) Aliphatic aldehydes, such as heptaldehyde and lauric aldehyde.

(10) Aliphatic ketones, such as pentadecanone-8 and heptadecanone-8.

(11) Esters of aliphatic acids, such as methyl stearate, ethyl palmitate, and glycerides, such as lard, palm oil, and cocoanut oil.

(12) Acylated amines, such as N-dodecyl acetamide and N-cetyl propionamide.

(13) Heterocyclic compounds, such as ethyl thiophene, piperidine, acetyl piperidine, and decahydrocarbazole.

The compounds in the thirteen groups set forth immediately above are examples of organic compounds, the molecules of which contain a portion which is aliphatically saturated.

It is believed that the following theoretical explanation will help enable the reader to further understand the present invention. It is to be understood that if the following theoretical explanation is later proven to be erroneous or fallacious it may be disregarded. The scope of the invention as indicated by the disclosure in this specification and by the appended claims is not to be affected by any possible errors or fallacies in the following theoretical explanation.

It has been found that when oxalyl chloride is treated with a reagent, such as an organic peroxide or actinic light, there results a free radical of the formula: .COCl and this free radical initiates a chain reaction which leads to the production of the carboxylic acid chloride. This reaction may be illustrated by the following:

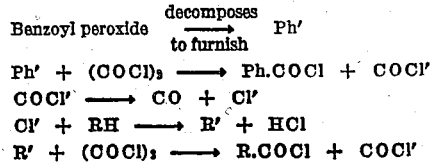

In place of benzoyl peroxide one may employ actinic light. In that case we postulate the reaction proceeding through the dissociation of the oxalyl chloride into two (COCl) free radicals and the chain is carried on as is indicated. In the case of certain unsaturated compounds such as styrene and phenyl acetylene the introduction of the COCl group may be accomplished without resort to the above mentioned reagents. Mere heating of the mixture of reactants accomplishes this result.

The actinic light used in this reaction must be of such quality that it produces the free (COCl) radicals previously postulated. It has been found that light from an ordinary tungsten lamp is effective.

Instead of using actinic light in conjunction with oxalyl chloride to produce carboxylic acid chlorides we may use peroxides in conjunction with oxalyl chloride as shown by the examples above. Peroxides in general are effective, especially organic peroxides, such as benzoyl peroxide, lauroyl peroxide, and ascaridole. When using peroxides it has been found that it is generally desirable to add small quantities of the peroxide to the reaction mixture periodically during the entire time that reaction is taking place. Claims covering the reaction of an organic compound with oxalyl chloride in the presence of an organic peroxide have been placed in our copending application, Serial No. 467,912, filed December 4, 1942, which is a division of the present application.

The carboxylic acid chlorides prepared according to the present invention may be converted to the corresponding carboxylic acids or to the salts, amides, or esters of these acids. These acids, salts, amides, and esters are useful in many arts.

One advantage of this invention is that it provides a one step method of preparing carboxylic acid chlorides from organic compounds which initially contain no carboxyl group. Heretofore, in the preparation of carboxylic acid chlorides it has generally been found necessary to first prepare the carboxylic acid and then to react said acid with a reagent such as phosphorus pentachloride. This invention provides the chemist with a method of directly inserting a —COCl radical into an organic compound, a portion of the molecule of which is aliphatically saturated.

The above description and examples are intended to be illustrative only and not to limit the scope of the invention. Any departure therefrom which conforms to the spirit of the invention and comes within the scope of the appended claims is to be regarded as an embodiment of this invention.

We claim:

1. A process of producing a carboxylic acid chloride which comprises reacting oxalyl chloride with an organic compound, which contains a portion which is aliphatically saturated and which is free from unsaturated linkages between acyclic carbon atoms in the presence of actinic light.

2. A process of producing a carboxylic acid chloride which comprises reacting oxalyl chloride with a hydrocarbon selected from the group consisting of saturated aliphatic and alicyclic hydrocarbons in the presence of actinic light.

MORRIS S. KHARASCH.
HERBERT C. BROWN.